United States Patent [19]

Yamada et al.

[11] Patent Number: 4,808,507

[45] Date of Patent: Feb. 28, 1989

[54] ELECTROPHOTOGRAPHIC PHOTORECEPTOR 2-PHENYL-BENZOOXAZOLE BISAZO BASED

[75] Inventors: Yasuyuki Yamada; Hisato Itoh; Tsutomu Nishizawa, all of Yokohama; Akihiro Yamaguchi, Kamakura, all of Japan

[73] Assignee: Mitsui Toatsu Chemicals, Incorporated, Tokyo, Japan

[21] Appl. No.: 90,284

[22] Filed: Aug. 28, 1987

[30] Foreign Application Priority Data

Sep. 1, 1986 [JP] Japan .................................. 61-203736

[51] Int. Cl.[4] ............................................... G03G 5/14

[52] U.S. Cl. ........................................ 430/73; 430/58; 430/77

[58] Field of Search ...................... 430/59, 58, 73, 76, 430/77

[56] References Cited

U.S. PATENT DOCUMENTS 4,413,045 11/1983 Ishikawa et al. ...................... 430/59
4,471,040 9/1984 Katagiri et al. ...................... 430/59

Primary Examiner—John L. Goodrow
Attorney, Agent, or Firm—Millen & White

[57] ABSTRACT

Disclosed herein is an electrophotographic photoreceptor having high sensitivity and excellent durability. The photoreceptor has a photosensitive layer which contains at least one bisazo compound having the 2-phenyl-benzooxazole skeleton.

9 Claims, 2 Drawing Sheets

ELECTROPHOTOGRAPHIC PHOTORECEPTOR 2-PHENYL-BENZOOXAZOLE BISAZO BASED

BACKGROUND OF THE INVENTION (1) Field of the Invention

This invention relates to an electrophotographic photoreceptor, and more specifically to an electrophotographic photoreceptor containing a novel azo compound as a charge-generating material in a photosensitive layer on an electrically-conductive base.

(2) Description of the Prior Art

Inorganic photosensitive materials such as selenium, cadmium sulfide and zinc oxide have heretofore been used widely as photosensitive materials for electrophotographic photoreceptors. However, photoreceptors using these photosensitive materials cannot fully satisfy properties required as electrophotographic photoreceptors such as sensitivity, light stability, moistureproofness and durability. For example, photoreceptors making use of selenium-base materials have excellent sensitivity. They are however accompanied by many drawbacks on the other hand. For example, they are prone to crystallization under heat or by adhesion of smear, so that their characteristic properties as photoreceptors tend to deteriorate. They are fabricated by vacuum evaporation and their fabrication costs are hence high. Due to lack of flexibility, it is difficult to form them into belt-like configurations. Photoreceptors making use of CdS-base materials have problems in moistureproofness and durability, whereas zinc oxide photoreceptors are insufficient in durability.

In order to overcome the above-mentioned drawbacks of photoreceptors which use such inorganic photosensitive materials, various photoreceptors making use of organic photosensitive materials have been studied.

As organic photosensitive materials which have already found some commercial utility, there are known, for example, photosensitive materials making combined use of 2,4,7-trinitro-9-fluorenone and poly-N-vinyl-carbazole. However, photoreceptors using the above photosensitive materials have low sensitivity and their durability is also not satisfactory.

Among photoreceptors developed to improve the above-mentioned drawbacks, photoreceptors each of which comprises a charge-generating layer and a charge-transporting layer having respective alotted functions (hereinafter called "function-separated photoreceptors") have drawn attention in recent years. In such a function-separated photoreceptor, materials having the above functions separately can be chosen from a wide range of materials and can then be used in combination. It is thus possible to fabricate a high-sensitivity and high-durability photoreceptor. As charge-generating materials useful in such function-separated photoreceptors, many materials have been reported. Of these, photoreceptors making use of organic dyes or organic pigments as charge-generating materials have attracted particular attention in recent years. There have been reported, for example, photoreceptors using bisazo pigments having the styryl stilbene skeleton (Japanese Patent Laid-Open No. 133445/1978), photoreceptors using bisazo pigments having the carbazole skeleton (Japanese Patent Laid-Open No. 95033/1978), photoreceptors using trisazo pigments having the triphenylamine skeleton (Japanese Patent Laid-Open No. 132347/1978), photoreceptors using bisazo pigments having the distyryl carbazole skeleton (Japanese Patent Laid-Open No. 14967/1979), photoreceptors using bisazo pigments having the bisstilbene skeleton (Japanese Patent Laid-Open No. 17733/1979), etc. These electrophotographic receptors cannot however fully satisfy the performance requirements. It has hence been desired to develop still better photoreceptors.

SUMMARY OF THE INVENTION

An object of this invention is to provide an electrophotographic photoreceptor having sufficient sensitivity and good durability.

Another object of this invention is to provide a novel charge-generating material useful in the electrophotographic photoreceptor.

The present inventors have conducted an investigation with a view toward achieving the above objects. As a result, it has been found that novel bisazo compounds having a 2-phenyl-benzooxazole skeleton, each of which is represented by the following general formula (I):

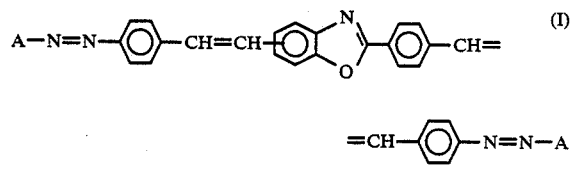

wherein A means a coupler residuum, can provide electrophotographic photoreceptors having excellent characteristics, such as higher sensitivity and durability, compared with those employing convention bisazo compounds. Accordingly, the present invention is an improvement in an electrophotographic photoreceptor In an electrophotographic photoreceptor including an electrically-conductive base and a photosensitive layer provided on the base, wherein the photosensitive layer contains at least one bisazo compound represented by the following general formula (I):

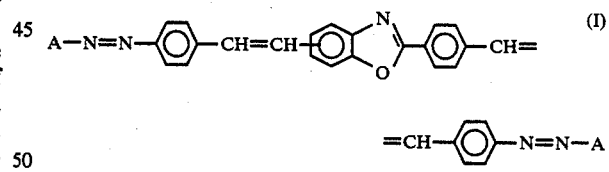

wherein A means a coupler residuum.

BRIEF DESCRIPTION OF THE DRAWINGS

In the accompanying drawings.

DETAILED DESCRIPTION OF THE INVENTION AND PREFERRED EMBODIMENTS

Figure 1:
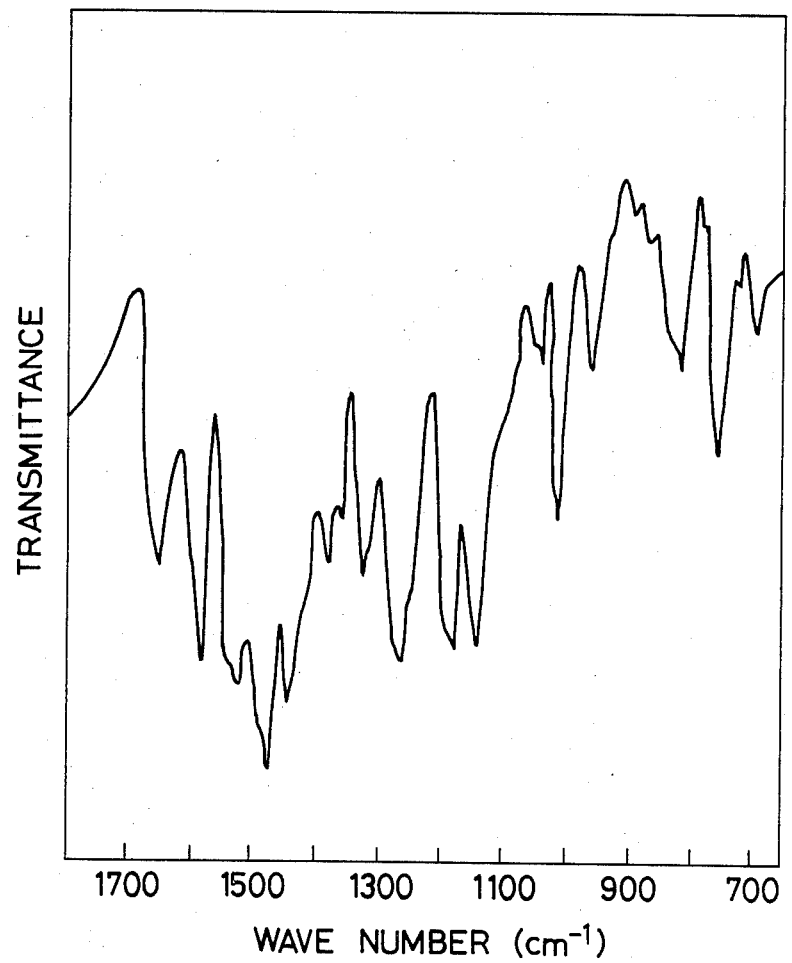
FIG. 1 shows an infrared absorption spectrum of bisazo Pigment No. 1 as measured by the KBr method.

Among the bisazo compounds represented by the general formula (I), those represented by the following general formula (II) or (III) are particularly suitable.

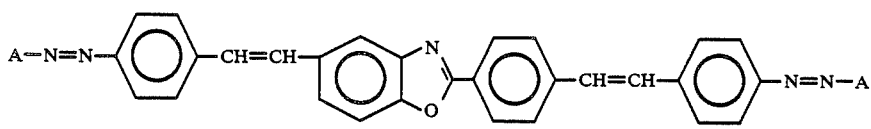 (II)

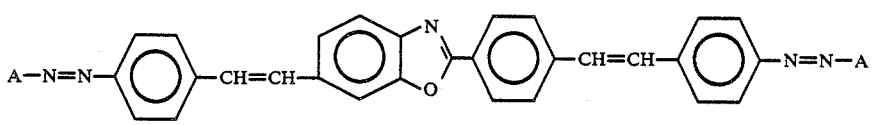 (III)

wherein A in each instance means a coupler residuum.

Examples as the coupler residuum A in the general formula (I) are.

(1) Those of the following general formula (IV):

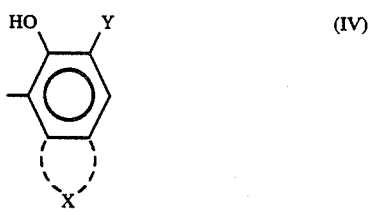 (IV)

wherein X means a substituted or unsubstituted cyclic hydrocarbon ring or a substituted or unsubstituted heterocyclic ring, Y denotes

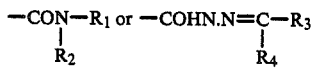

in which $R_1$ means a substituted or unsubstituted cyclic hydrocarbon ring or a substituted or unsubstituted heterocyclic ring, $R_2$ denotes a hydrogen atom, a substituted or unsubstituted alkyl group or a substituted or unsubstituted phenyl group, $R_3$ is a substituted or unsubstituted cyclic hydrocarbon ring, a substituted or unsubstituted heterocyclic ring or a substituted or unsubstituted styryl group, $R_4$ means a hydrogen atom, an alkyl group or a substituted or unsubstituted phenyl group, and $R_3$ and $R_4$ may optionally form a ring together with the carbon atom to which $R_3$ and $R_4$ are bonded.

As illustrative specific examples of X in the general formula (IV), may be mentioned hydrocarbon rings such as naphthalene ring and anthracene rings as well as heterocyclic rings such as indole ring, carbazole ring, benzocarbazole ring and dibenzofuran rings, each of which is fused with the benzene ring to which the hydroxyl group and Y are bonded.

Where X is substituted, halogen atoms such as chlorine and bromine and hydroxyl group may be mentioned as exemplary substituents.

As illustrative examples of the cyclic group represented by $R_1$ or $R_3$, may be mentioned cyclic hydrocarbon groups such as phenyl, naphthyl, anthryl and pirenyl; and heterocyclic groups such as pyridyl, thienyl, furyl, indolyl, benzofuranyl, carbazolyl and dibenzofuranyl. As a ring which $R_3$ and $R_4$ form as a result of their coupling, the fluorene ring or the like may be mentioned by way of example.

Where $R_1$ or $R_3$ is a substituted cyclic ring, illustrative examples of the substituent or substituents are alkyl groups such as methyl, ethyl, propyl and butyl; alkoxy groups such as methoxy, ethoxy, propoxy and butoxy; halogen atoms such as chlorine and bromine atoms; halomethyl groups such as trifluoromethyl; dialkylamino groups such as dimethylamino and diethylamino; nitro group; cyano group; and carboxyl group and its ester groups.

Where $R_2$ is a phenyl group, halogen atoms such as chlorine and bromine atoms may be mentioned as illustrative substituents for the phenyl group.

(2) Those of the following general formula (V) or (VI):

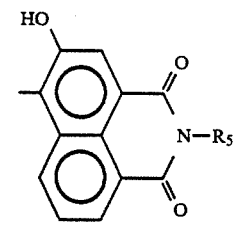 (V)

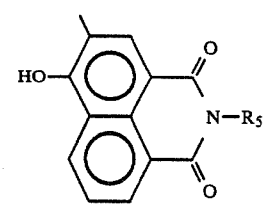 (VI)

wherein $R_5$ means a substituted or unsubstituted hydrocarbon group.

Illustrative specific examples of $R_5$ may include alkyl groups such as methyl, ethyl, propyl, butyl and octyl; and alkoxyalkyl groups such as methoxyethyl and ethoxyethyl.

(2) Those of the general formula (VII):

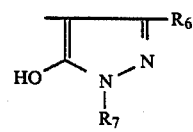 (VII)

wherein $R_6$ means alkyl, carbamoyl, or carboxyl or an ester group thereof, $R_7$ denotes a substituted or unsubstituted cyclic hydrocarbon group.

Examples of $R_7$ cyclic hydrocarbon groups are phenyl and naphthyl. Where these groups are substituted, illustrative substituents are alkyl groups such as methyl, ethyl, propyl and butyl; alkoxy groups such as methoxy, ethoxy, propoxy and butoxy; dialkylamino groups such as dimethylamino and diethylamino; halogen atoms such as chlorine and bromine atoms; nitro; and cyano.

(4) Those represented by the general formula (VIII) or (IX):

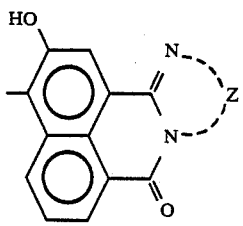 (VIII)

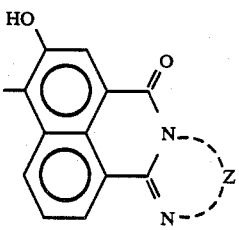 (IX)

wherein Z means a substituted or unsubstituted divalent cyclic hydrocarbon group, or a substituted or unsubstituted divalent heterocyclic group.

As specific examples of Z, are divalent residua of monocyclic aromatic hydrocarbons, such as o-phenylene; divalent residua of fused polycyclic aromatic hydrocarbons, such as o-napthylene, peri-naphthylene, 1,2-anthraquinonylene and 9,10-phenanthrylene; and divalent residua of heterocyclic rings, such as 3,4-pyrazolediyl, 2,3-pyridinediyl, 4,5-pyrimidinediyl, 6,7-imidazolediyl, 5,6-benzimidazolediyl and 6,7-quinolinediyl. Where these cyclic groups are substituted, exemplary substituents are alkyl groups such as methyl, ethyl, propyl and butyl; alkoxy groups such as methoxy, ethoxy, propoxy and butoxy; dialkylamino groups such as dimethylamino and diethylamino; halogen atoms such as chlorine and bromine atoms; nitro; and cyano.

Among the coupler residua exemplified above, represented by the general formula (IV) are most preferable because of their high optical sensitivity, the ready availability of their intermediate raw materials and their low cost of production.

Examples of specific bisazo compounds useful in the practice of this invention are those whose structural formulae are shown in Tables 1 and 2.

TABLE 1

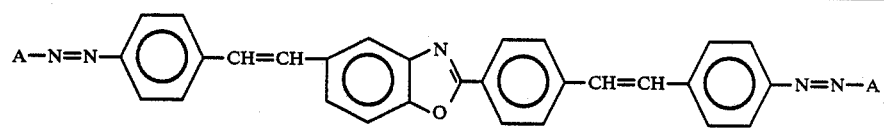

| Bisazo Compound No. | A |
|---|---|
| 1 | 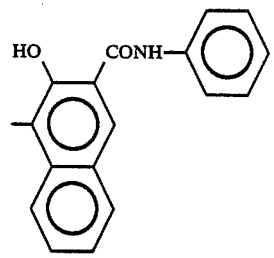 |
| 2 | 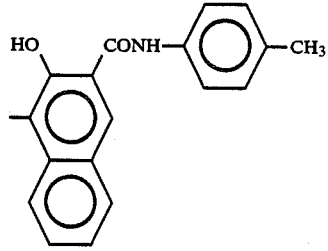 |
| 3 | 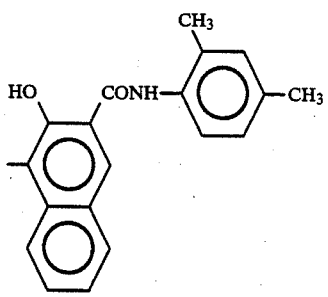 |

TABLE 1-continued
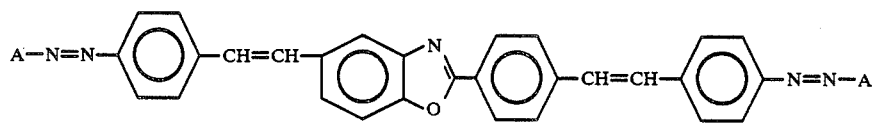
| Bisazo Compound No. | A |
|---|---|
| 4 | 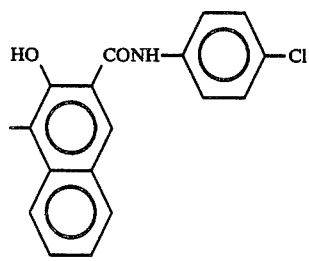 |
| 5 | 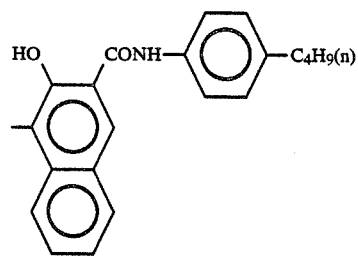 |
| 6 | 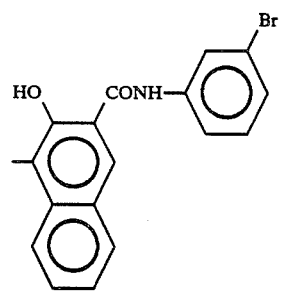 |
| 7 | 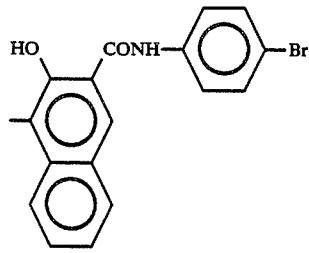 |
| 8 | 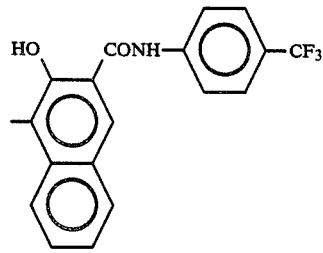 |

TABLE 1-continued
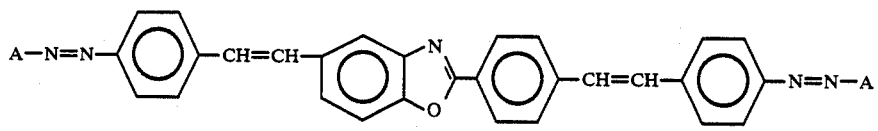
| Bisazo Compound No. | A |
|---|---|
| 9 | 3-hydroxy-4-methyl-N-(2-trifluoromethylphenyl)-2-naphthamide |
| 10 | 3-hydroxy-4-methyl-N-(3-trifluoromethylphenyl)-2-naphthamide |
| 11 | N-(4-cyanophenyl)-3-hydroxy-4-methyl-2-naphthamide |
| 12 | 3-hydroxy-4-methyl-N-(3-nitrophenyl)-2-naphthamide |
| 13 | N-(2,4-dimethoxyphenyl)-3-hydroxy-4-methyl-2-naphthamide |

TABLE 1-continued
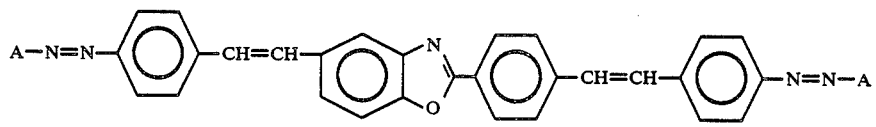
| Bisazo Compound No. | A |
|---|---|
| 14 | 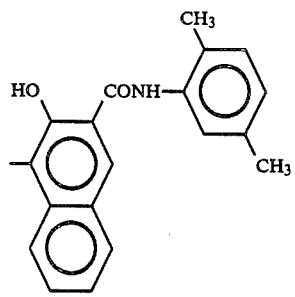 |
| 15 | 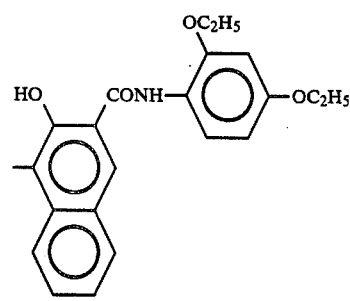 |
| 16 | 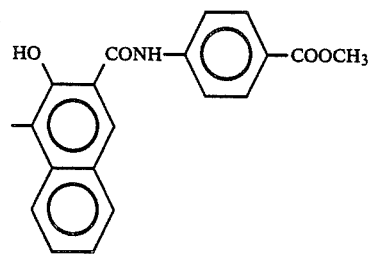 |
| 17 | 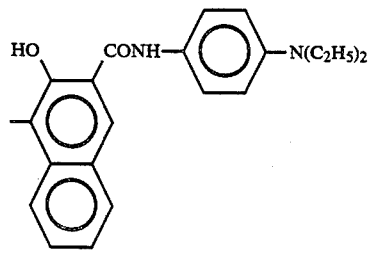 |
| 18 | 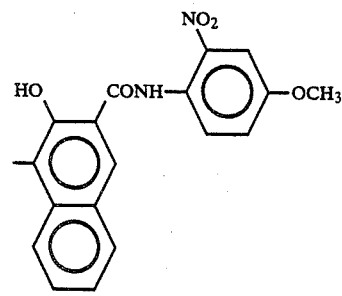 |

TABLE 1-continued
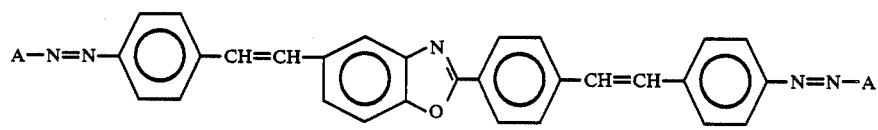
| Bisazo Compound No. | A |
|---|---|
| 19 | 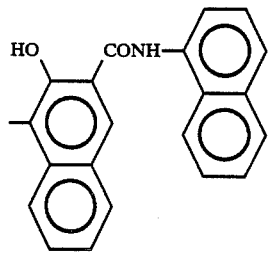 |
| 20 | 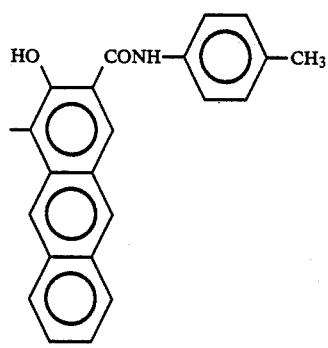 |
| 21 | 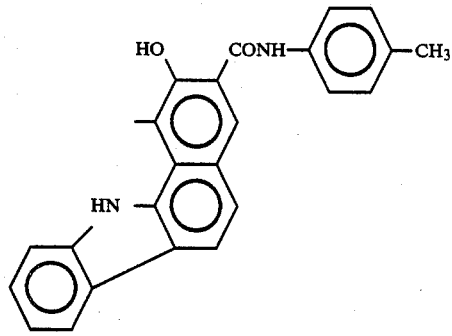 |
| 22 | 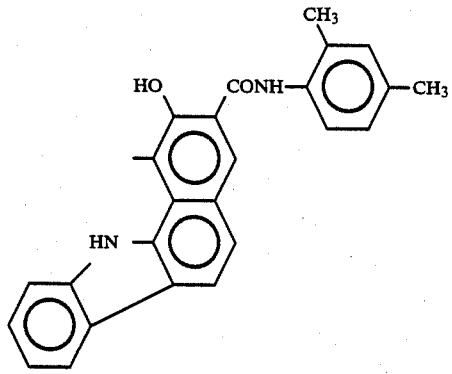 |

TABLE 1-continued
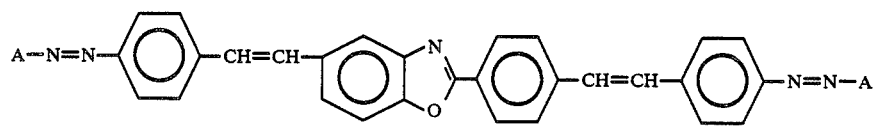
| Bisazo Compound No. | A |
|---|---|
| 23 | 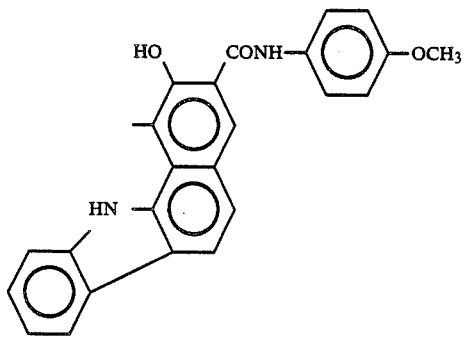 |
| 24 | 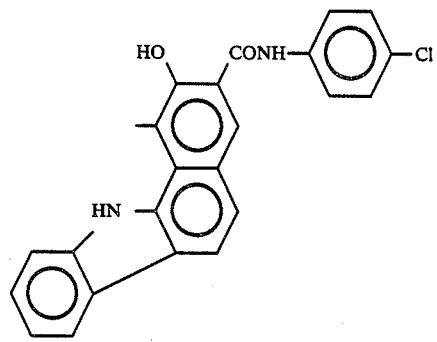 |
| 25 | 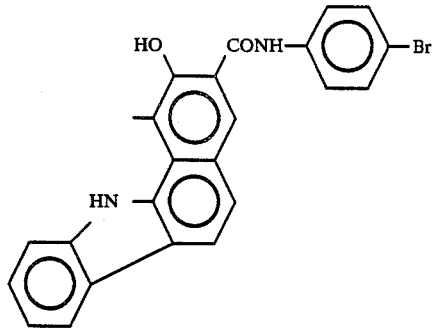 |
| 26 | 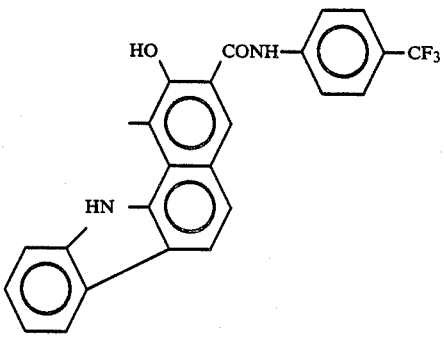 |

TABLE 1-continued
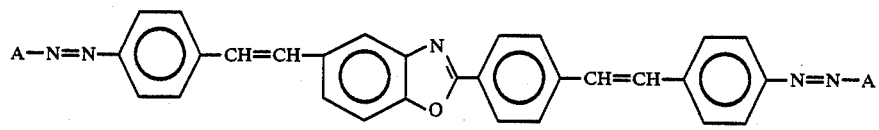
| Bisazo Compound No. | A |
|---|---|
| 27 | 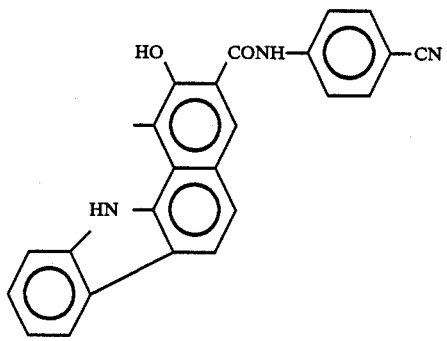 |
| 28 | 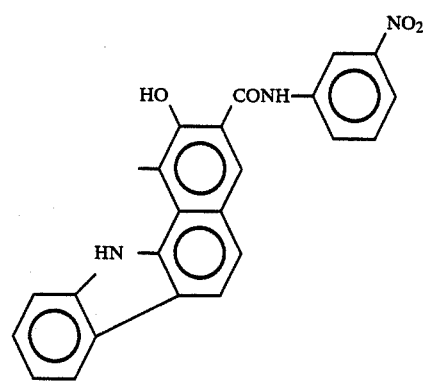 |
| 29 | 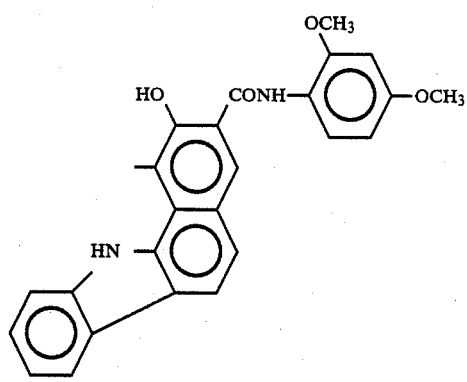 |
| 30 | 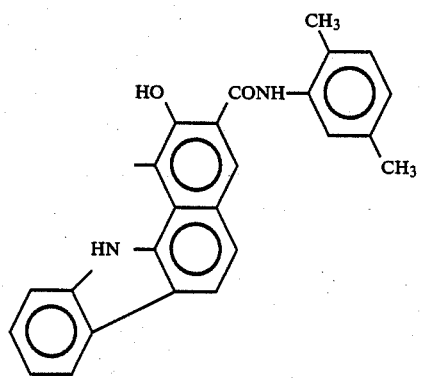 |

TABLE 1-continued
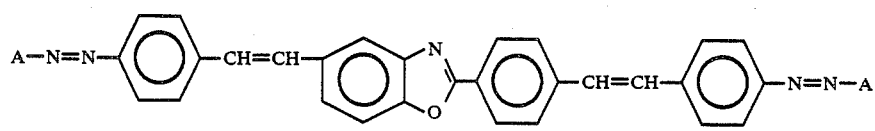
| Bisazo Compound No. | A |
|---|---|
| 31 | 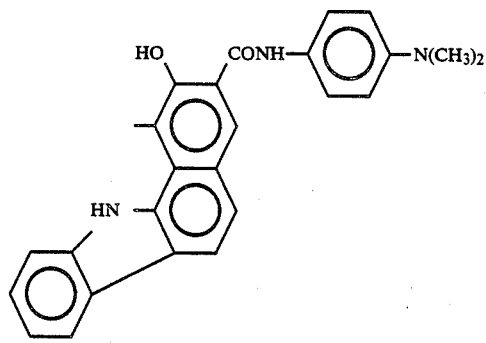 |
| 32 | 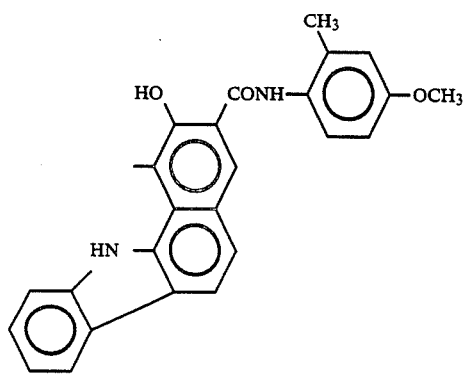 |
| 33 | 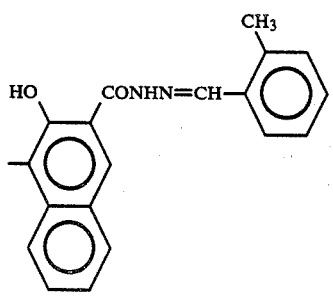 |
| 34 | 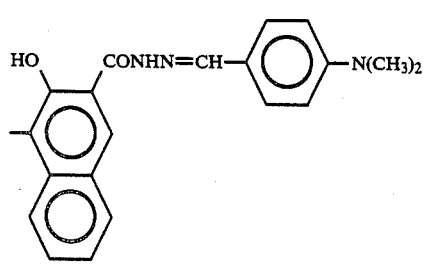 |

TABLE 1-continued
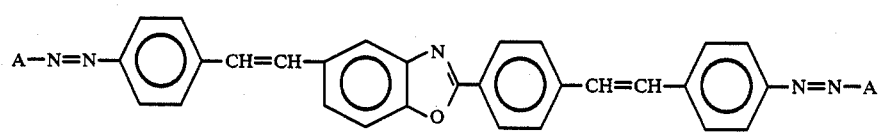
| Bisazo Compound No. | A |
|---|---|
| 35 | 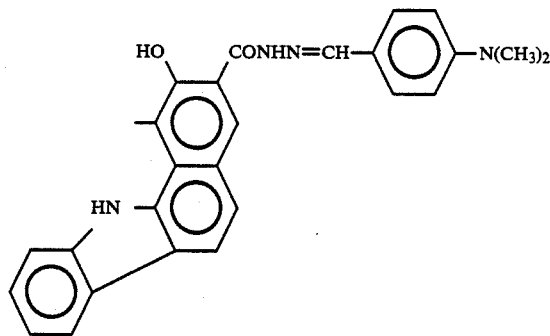 |
| 36 | 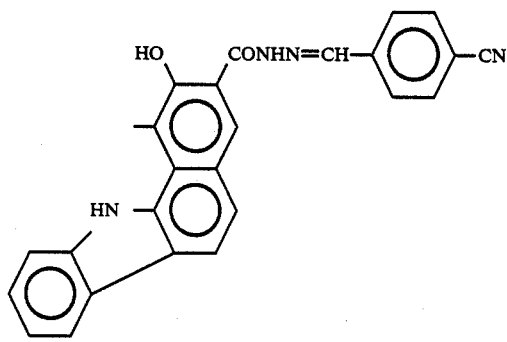 |
| 37 | 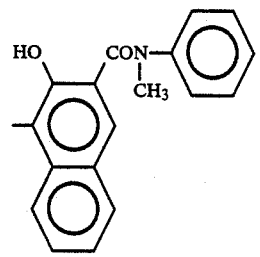 |
| 38 | 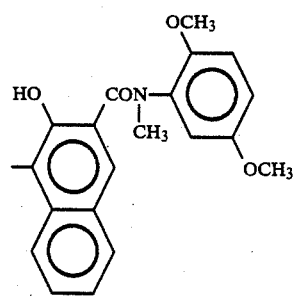 |

TABLE 1-continued
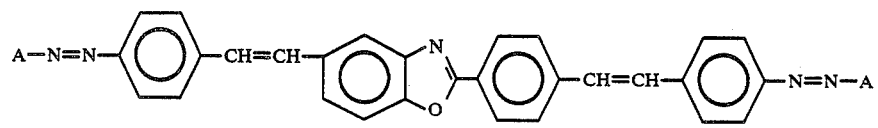
| Bisazo Compound No. | A |
|---|---|
| 39 | 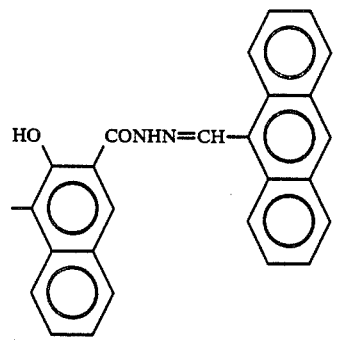 |
| 40 | 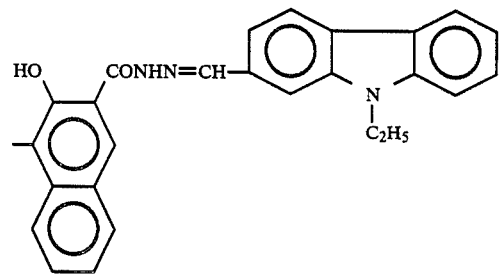 |
| 41 | 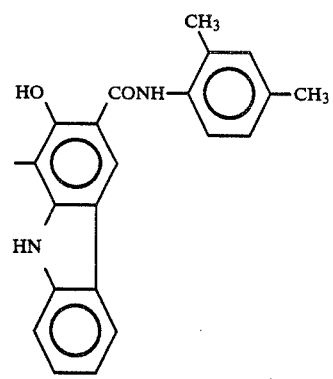 |
| 42 | 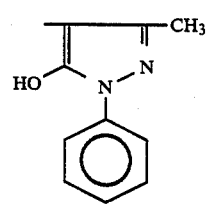 |
| 43 | 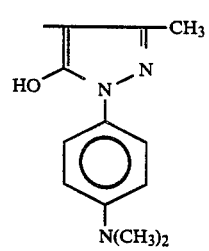 |

TABLE 1-continued
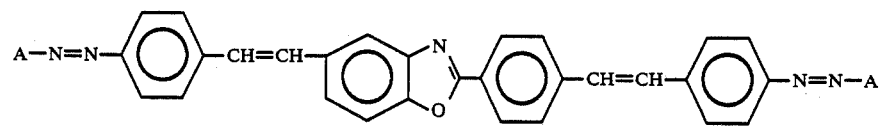
| Bisazo Compound No. | A |
|---|---|
| 44 | 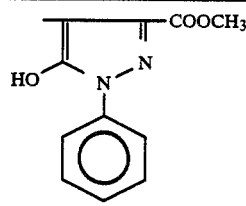 |
| 45 | 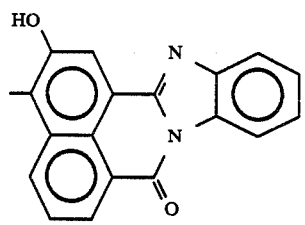 |
| 46 | 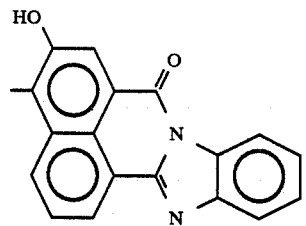 |
TABLE 2
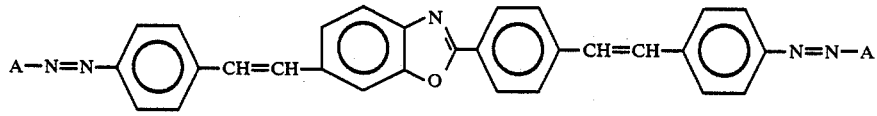
| Bisazo Compound No. | A |
|---|---|
| 47 | 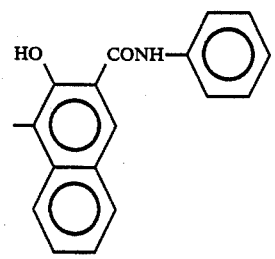 |
| 48 | 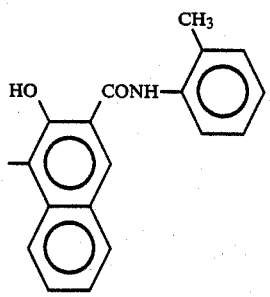 |

TABLE 2-continued
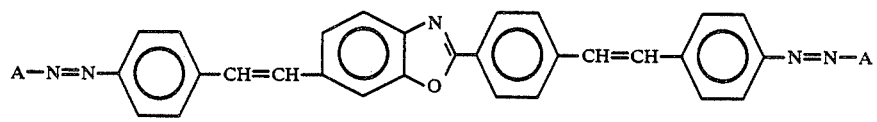
| Bisazo Compound No. | A |
|---|---|
| 49 | 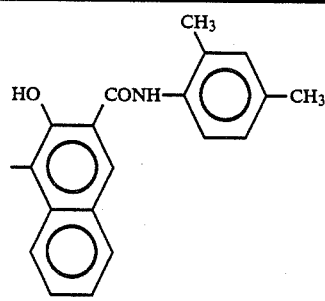 |
| 50 | 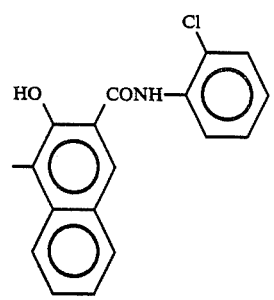 |
| 51 | 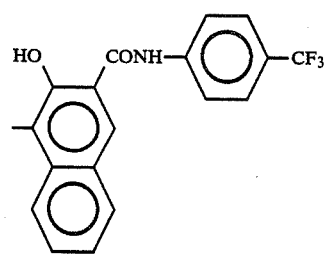 |
| 52 | 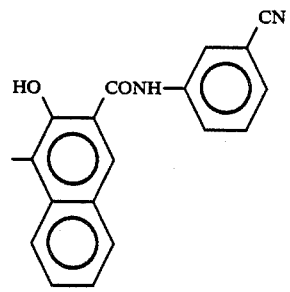 |
| 53 | 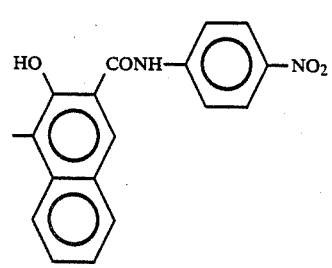 |

TABLE 2-continued
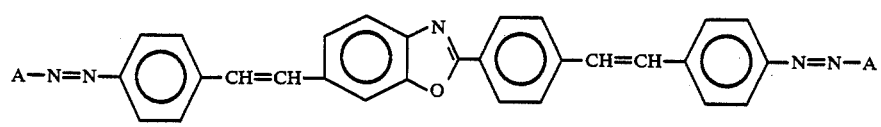
| Bisazo Compound No. | A |
|---|---|
| 54 | 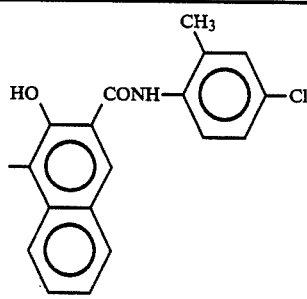 |
| 55 | 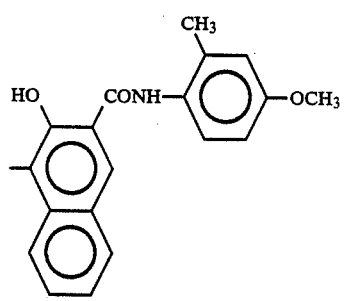 |
| 56 | 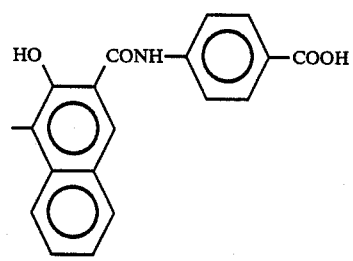 |
| 57 | 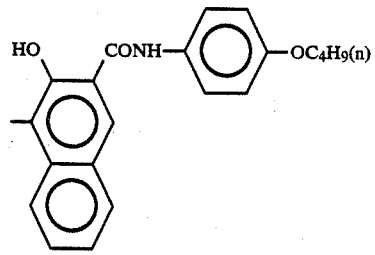 |
| 58 | 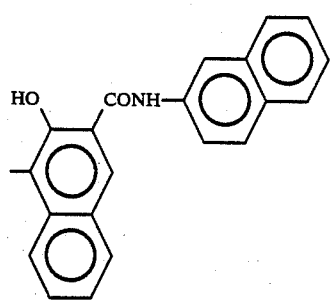 |

TABLE 2-continued
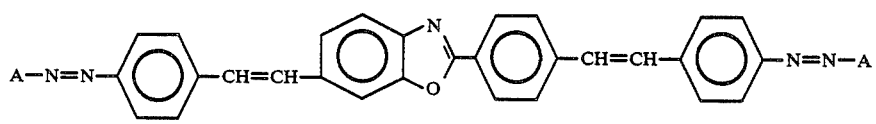
| Bisazo Compound No. | A |
|---|---|
| 59 | 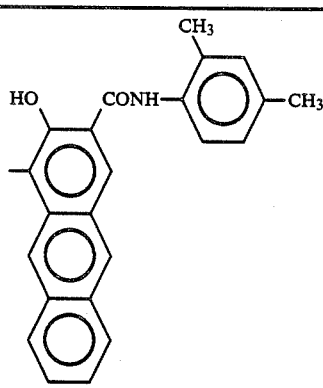 |
| 60 | 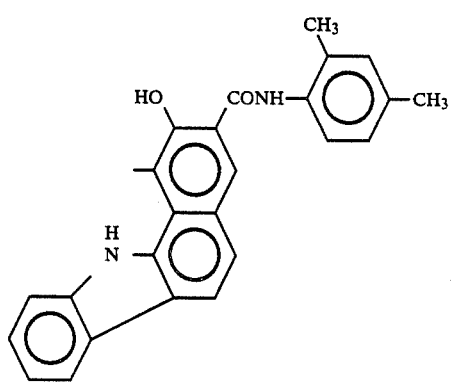 |
| 61 | 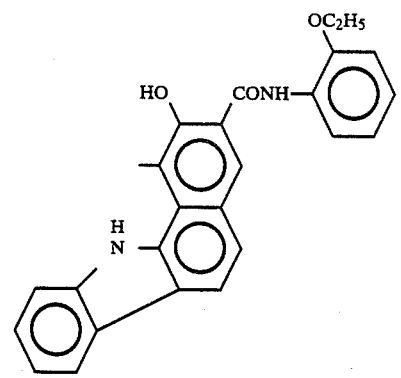 |
| 62 | 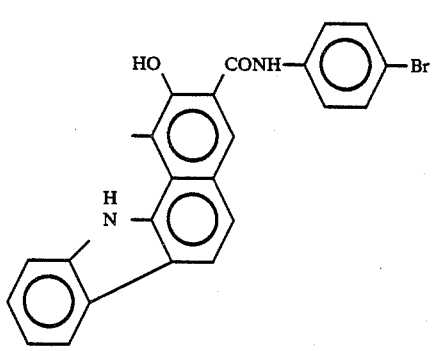 |

TABLE 2-continued
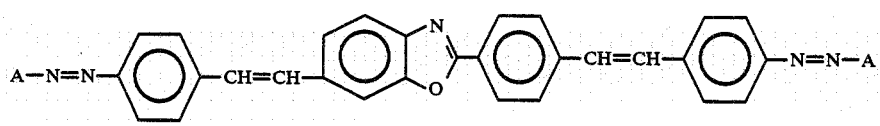
| Bisazo Compound No. | A |
|---|---|
| 63 | 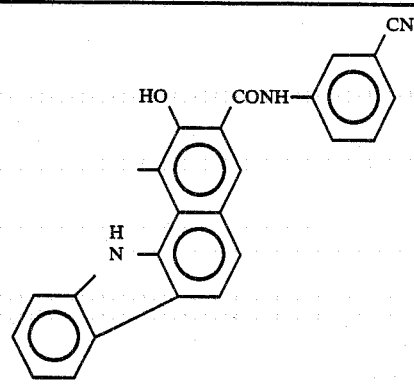 |
| 64 | 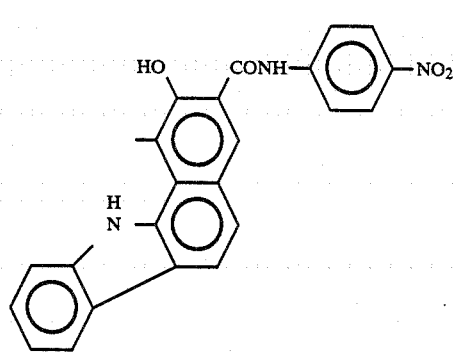 |
| 65 | 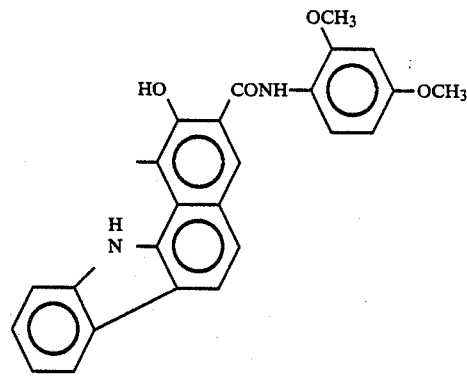 |
| 66 | 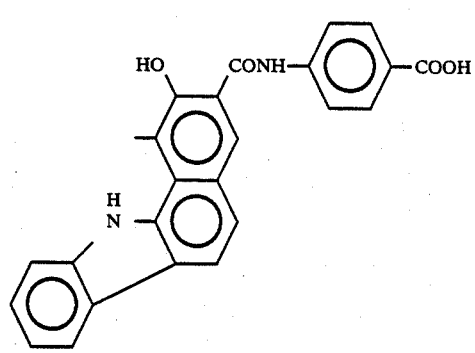 |

TABLE 2-continued
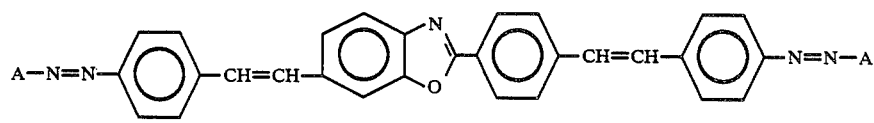
| Bisazo Compound No. | A |
|---|---|
| 67 | 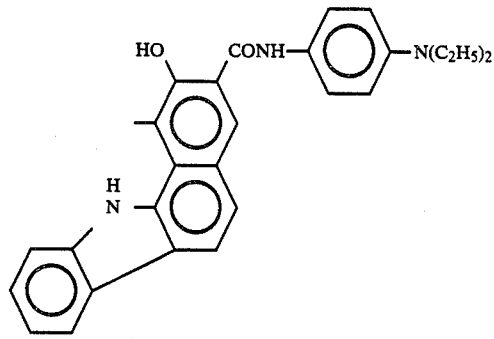 |
| 68 | 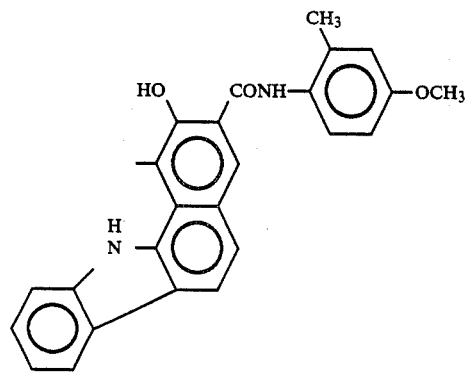 |
| 69 | 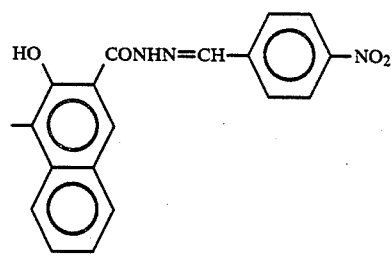 |
| 70 | 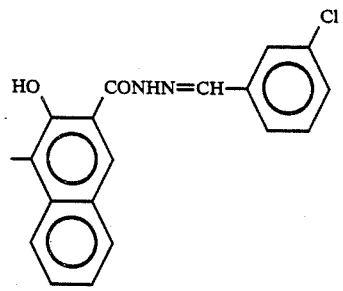 |

TABLE 2-continued
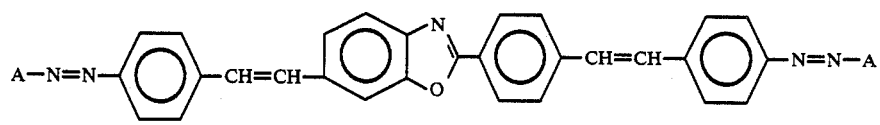
| Bisazo Compound No. | A |
|---|---|
| 71 | 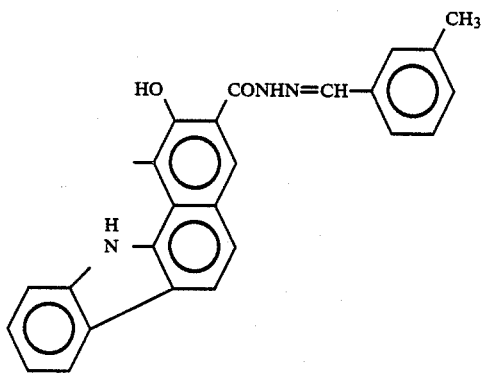 |
| 72 | 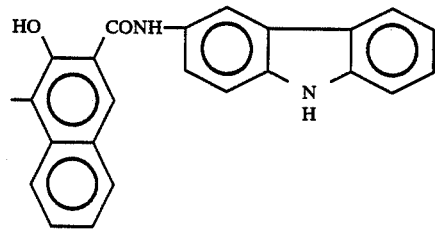 |
| 73 | 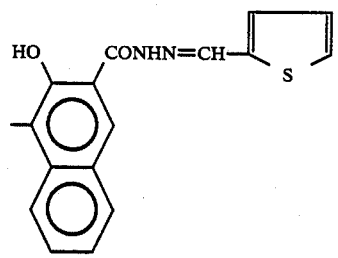 |
| 74 | 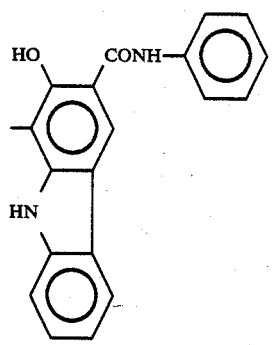 |

TABLE 2-continued
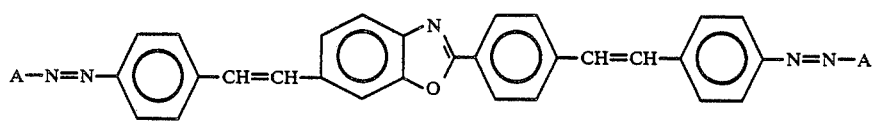
| Bisazo Compound No. | A |
|---|---|
| 75 | 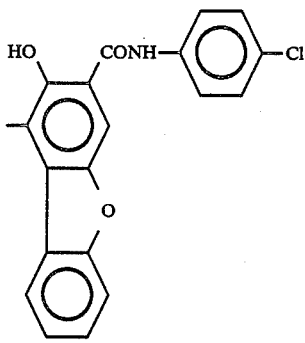 |
| 76 | 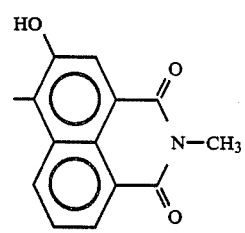 |
| 77 | 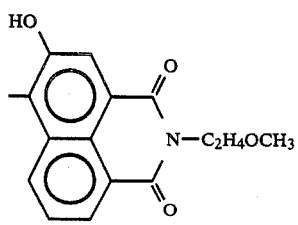 |
| 78 | 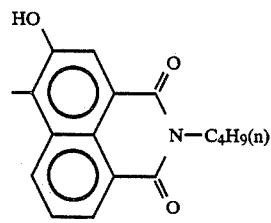 |
| 79 | 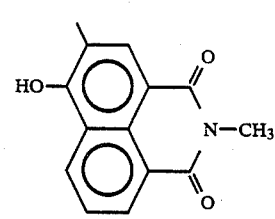 |
| 80 | 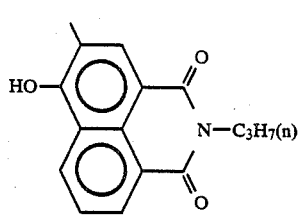 |

TABLE 2-continued
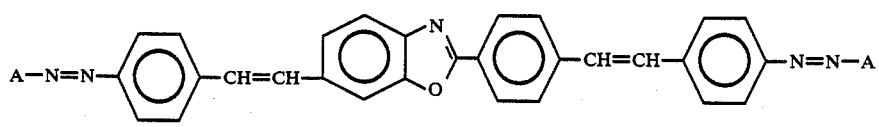
| Bisazo Compound No. | A |
|---|---|
| 81 | 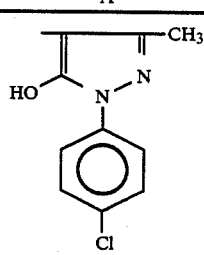 |
| 82 | 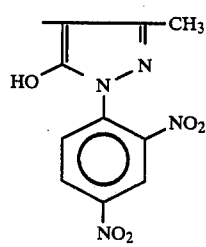 |
| 83 | 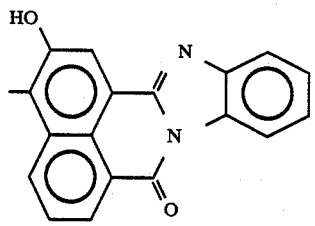 |
| 84 | 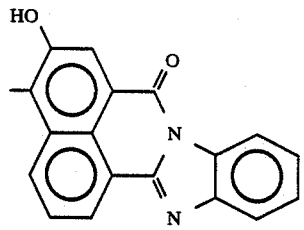 |
| 85 | 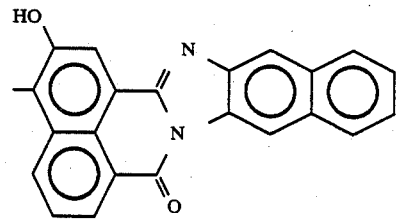 |
| 86 | 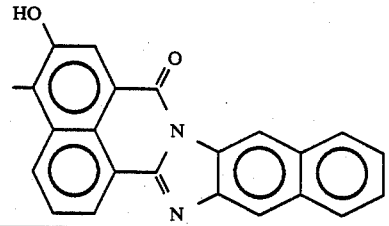 |
The bisazo compounds represented by the general formula (I) can be prepared in a manner known per se in the art. For example, they may be synthesized by the following reaction scheme.

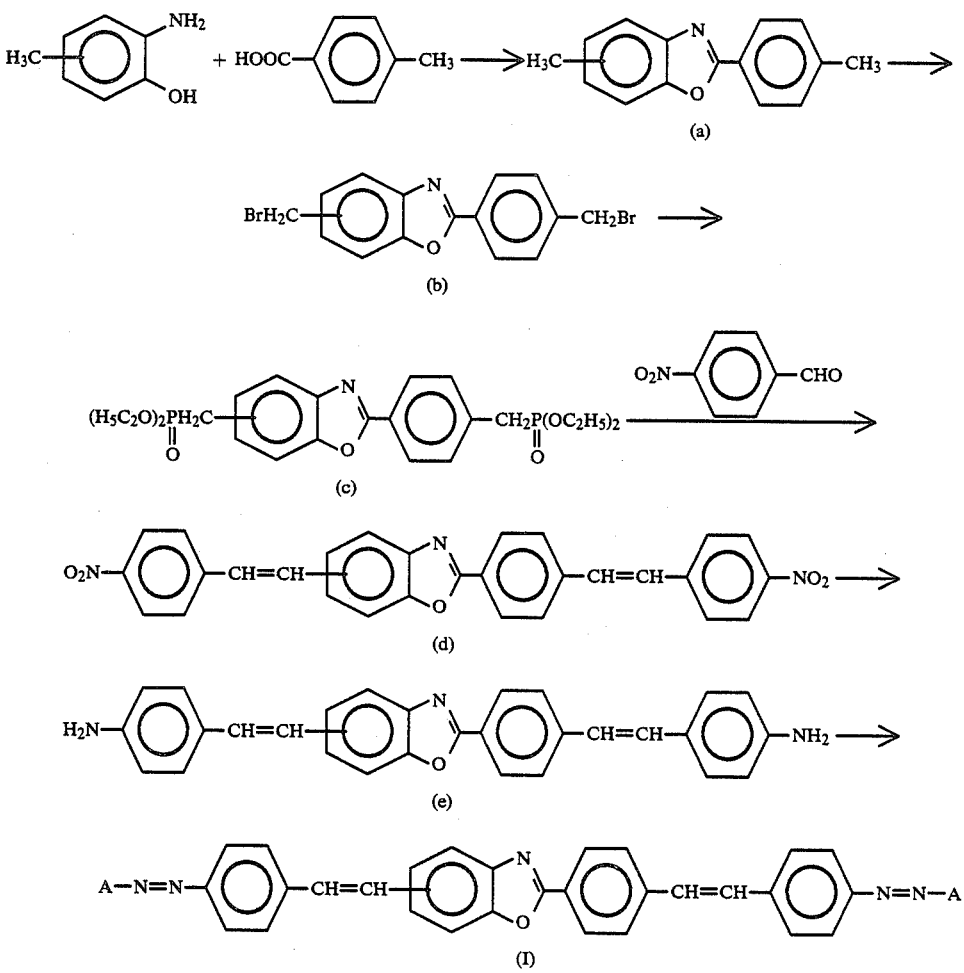

According to this reaction scheme, the methyl-substituted derivative of an o-aminophenol such as 6-amino-m-cresol or 2-amino-4-methylphenol and p-toluic acid is subjected to a condensation and ring-closure reaction under heat in polyphosphoric acid, thereby to obtain compound (a), which is then reacted with N-bromosuccinimide, whereby the compound (b) is obtained. After reaction with triethyl phosphite to form the compound (c), p-nitrobenzaldehyde is reacted to obtain compound (d). Compound (d) is thereafter reduced to obtain the diamine compound (e) which is a precursor of a compound of the general formula (I).

The disazo compound of the general formula (I) can be prepared easily, for example, by converting compound (e) into a tetrazo form and then coupling it with a coupler in the presence of an alkali or by isolating the above-mentioned tetrazonium salt of the diamine in the form of a borofluoride and then causing a base to act on the borofluoride in a suitable organic solvent, e.g., N,N-dimethylformamide, so as to induce a coupling reaction.

The electrophotographic photoreceptor of this invention contains at least one disazo compounds, represented by the general formula (I), as a charge-generating material in a photoconductive layer on an electrically-conductive base. Typical constructions of such a photoreceptor are illustrated respectively in FIGS. 2 and 3 by way of example.

Figure 2:
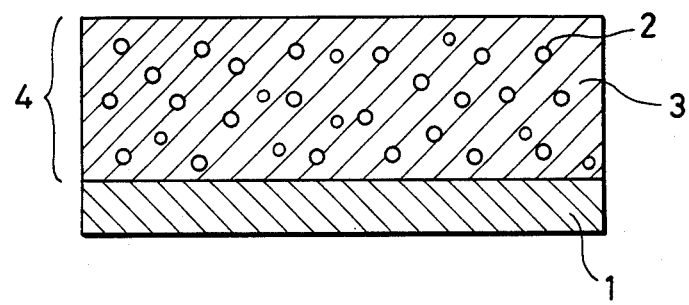
FIGS. 2 and 3 are schematic cross-sectional views showing illustrative examples of the construction of an electrophotographic photoreceptor respectively.

The photoreceptor of FIG. 2 is a dispersion-type photoreceptor, in which a photosensitive layer 4 containing a charge-generating material 2 and a charge-transporting material 3 in a binder is provided on an electrically-conductive base 1. The photoreceptor of FIG. 3 is a laminated photoreceptor which includes, on an electrically-conductive base 1, a charge-generating layer 6 with a charge-generating material 2 contained in a binder and a charge-transporting layer 5 with a charge-transporting material 3 contained in a binder.

In the aforementioned laminated photoreceptor, the positions of the charge-generating layer and charge-transporting layer may be reversed and intermediate layer(s) may be disposed between the photo-sensitive layer and the electrically-conductive base.

Figure 3:
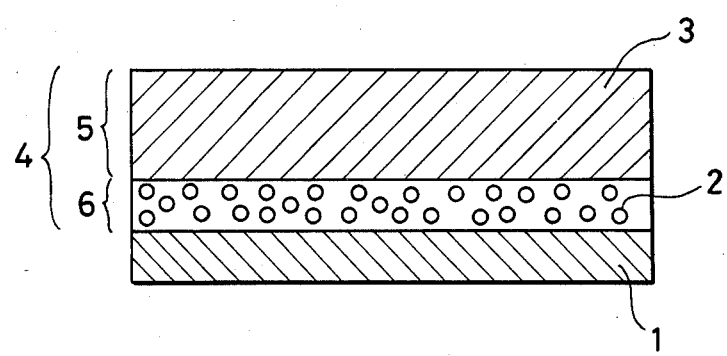

In the photoreceptor of FIG. 3, light which has been obtained subsequent to exposure of a picture or mark transmits through the charge-transporting layer, whereby the charge-generating material generates charges in the charge-generating layer. The thus-produced charges are charged into the charge-transporting layer, so that the charge-transporting material performs their transportation.

The electrophotographic photoreceptor of this invention is composed of an electrically-conductive base, a binder, a charge-transporting material and the like in addition to the disazo compound of the general formula (I). No particular limitation is however imposed on other components or elements of the photoreceptor so long as they have functions as components or elements for photoreceptors.

As illustrative examples of the electrically-conductive base useful in the practice of this invention, are metal plates such as aluminum, copper and zinc plates, those obtained by depositing an electrically-conductive material such as aluminum or $SnO_2$ on plastic sheets or films such as polyester sheets or films, and paper rendered electrically conductive.

As binders may be used vinyl polymers such as polystyrene, polyacrylamide and poly-N-vinylcarbazole as well as condensation polymers such as polyamide resins, polyester resins, epoxy resins, phenoxy resins and polycarbonate resins. Any resin may be used as a binder, so long as it is electrically insulating and has close adhesion to bases.

Charge-transporting materials may generally be classified into two kinds, one being hole-transporting materials and the other electron-transporting materials. In the photoreceptor of this invention, both kinds of charge-transporting materials can be used. In addition to electron-receptive materials having ability to transport electrons such as trinitrofluorenone and tetranitrofluorenone, the following materials may be mentioned as exemplary hole-transporting materials: electron-donative materials having ability to transport holes, such as polymers containing heterocyclic compounds typified by poly-N-vinylcarbazole; triazole derivatives; oxadiazole derivatives; imidazole derivatives; pyrazoline derivatives; polyarylalkane derivatives; phenylenediamine derivatives; hydrazone derivatives; amino-substituted chalcon derivatives; triarylamine derivatives; carbazole derivatives; and stilbene derivatives.

There are, for example, 9-ethylcarbazole-3-aldehyde-1-methyl-1-phenylhydrazone, 9-ethylcarbazole-3-aldehyde-1-benzyl-1-phenylhydrazone, 9-ethylcarbazole-3-aldehyde-1,1-diphenylhydrazone, 4-diethylaminostyrene-β-aldehyde-1-methyl-1-phenylhydrazone, 4-methoxynaphthalene-1-aldehyde-1-benzyl-1-phenylhydrazone, 4-methoxybenzaldehyde-1-methyl-1-phenylhydrazone, 2,4-dimethoxybenzaldehyde-1-benzyl-1-phenylhydrazone, 4-diethylaminobenzaldehyde-1,1-diphenylhydrazone, 4-methoxybenzaldehyde-1-benzyl-1-(4-methoxy)phenylhydrazone, 4-diphenylaminobenzaldehyde-1-benzyl-1-phenylhydrazone, 4-dibenzylaminobenzaldehyde-1,1-diphenylhydrazone, 1,1-bis(4-dibenzylaminophenyl)propane, tris(4-diethylaminophenyl)methane, 1,1-bis(4-dibenzylaminophenyl)propane, 2,2'-dimethyl-4,4'-bis(diethylamino)-triphenylmethane, 9-(4-diethylaminostyryl)anthracene, 9-bromo-10-(4-diethylaminostyryl)anthracene, 9-(4-dimethylaminobenzylidene)fluorene, 3-(9-fluorenylidene)-9-ethylcarbazole, 1,2-bis(4-diethylaminostyryl)benzene, 1,2-bis(2,4-dimethoxystyryl)-benzene, 3-styryl-9-ethylcarbazole, 3-(4-methoxystyryl)-9-ethylcarbazole, 4-diphenylaminostilbene, 4-dibenzylaminostilbene, 4-ditolylaminostilbene, 1-(4-diphenylaminostyryl)naphthalene, 1-(4-diethylaminostyryl)naphthalene, 4'-diphenylamino-α-phenylstilbene, 4'-methylphenylamino-α-phenylstilbene, 1-phenyl-3-(4-diethylaminostyryl)-5-(4-diethylaminophenyl)pyrazoline, and 1-phenyl-3-(4-dimethylaminostyryl)-5-(4-dimethylaminophenyl)pyrazoline.

Examples of other hole-transporting materials, are 2,5-bis(4-diethylaminophenyl)-1,3,4-oxadiazole, 2,5-bis[4-(4-diethylaminostyryl)-phenyl]-1,3,4-oxadiazole, 2-(9-ethylcarbazolyl-3-)-5-(4-diethylaminophenyl)-1,3,4-oxadiazole, 2-vinyl-4-(2-chlorophenyl)-5-(4-diethylaminophenyl)oxazole, 2-(4-diethylaminophneyl)-4-phenyloxazole, 9-[3-(4-diethylaminophenyl)-2-propenylidene]-9H-xanthene, poly-N-vinylcarbazole, halogenated poly-N-vinylcarbazoles, polyvinylpyrene, polyvinylanthracene, pyreneformaldehyde resins, and ethylcarbazole-formaldehyde resins.

Examples of electron-transporting materials, are chloroanil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indino[1,2-b]thiophen-4-one and 1,3,7-trinitrodibenzothiophene-5,5-dioxide.

These charge-transporting materials may be used either singly or in combination.

Between the photosensitive layer and the electrically-conductive layer, an intermediate layer may be provided as needed. Polyamide, nitrocellulose, casein, polyvinyl alcohol or the like is suitable as its material. The thickness of the intermediate layer preferably 1 μm or less.

For the fabrication of the photoreceptor, conventionally-known processes may be used. In the case of a laminated photoreceptor, fine particles of a disazo compound are dispersed in a solution in which a binder is dissolved. The resultant coating formulation is applied onto an electrically-conductive base and is then dried to obtain a charge-generating layer. Thereafter, a solution with a charge-transporting material and a binder dissolved therein is coated thereon and then dried to form a charge-transporting layer. Other methods may also be used to form such a charge-producing layer. For example, a disazo pigment may be applied by vacuum evaporation. Alternatively, a solution of a disazo pigment may be coated and then dried. The former method is however accompanied by a drawback, viz., the fabrication cost is high. The latter method involves drawbacks in operation, because it uses an organic amine which is generally inconvenient to handle, e.g., ethylenediamine or n-butylamine. It is therefore suitable to coat a dispersion of fine particles of a disazo compound. The coating may be effected by a usual method, for example, by the doctor blade method, dipping method or wire bar method.

The optimal thickness range of each photosensitive layer varies depending on the kind of the associated photoreceptor. For example, the thickness preferably 3–50 μm with 5–30 μm being more preferable in the case of such a photoreceptor as shown in FIG. 2.

In the case of a photoreceptor such as that shown in FIG. 3, the thickness of the charge-generating layer 6 preferably 0.01–5 μm with 0.05–2 μm being more preferred. If the thickness is less than 0.01 μm, the generation of charges is not sufficient. On the other hand, thickness greater than 5 μm is not preferred from the practical viewpoint since such large thicknesses lead to high residual potentials. Further, the thickness of the charge-transporting layer 5 preferably is 3–50 μm with 5–30 μm being more preferred. Any thicknesses smaller than 3 μm cannot achieve a sufficient charge level, whereas thicknesses greater than 50 μm are not preferable from the practical viewpoint because they lead to high residual potentials.

The content of the disazo compound of the general formula (I) in the photosensitive layer varies in accordance with the kind of each photoreceptor. In the case of such a photoreceptor as shown in FIG. 2, the disazo compound content is 50 wt.% or less, more preferably, 20 wt.% or less in the photosensitive layer 4. Further, a charge-transporting material is also added preferably in a proportion of 10–95 wt.%, more preferably, 30–90 wt.%, to the photosensitive layer 4. In the case of a photoreceptor as depicted in FIG. 3, the proportion of the disazo compound in the charge-generating layer 5 preferably is at least 30 wt.% with at least 50 wt.% being more preferred. In addition, 10–95 wt.%, preferably, 30–90 wt.% of a charge-transporting material is incorporated in the charge-transporting layer 6. If the content of the charge-transporting material in this layer is less than 10 wt.%, the transportation of charges is not effected substantially. On the other hand, any amounts in excess of 95 wt.% are not preferable from the practical viewpoint because the mechanical strength of the photoreceptor is reduced.

Owing to the use of the disazo compound represented by the general formula (I) as a charge-generating material, the electrophotographic photoreceptor of this invention is easy to fabricate and has excellent properties. Its sensitivity is high and its performance does not deteriorate through repeated use.

The present invention will hereinafter be described specifically by the following Examples. It should however be borne in mind that this invention is not limited to or by the following Examples.

PREPARATION EXAMPLE 1

In a solution consisting of 600 ml of water and 15 ml of 35% hydrochloric acid, was suspended 2.2 g of a diamine compound represented by the following structural formula:

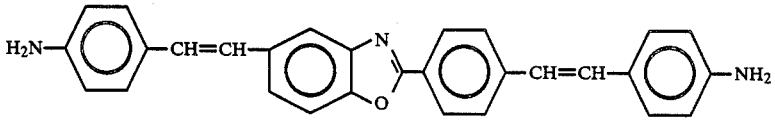

After allowing the resultant suspension to stand overnight, a solution of 1.1 g of sodium nitrite in 20 ml of water was added dropwise at 0°–5° C., followed by stirring at the same temperature for 3 hours. After removing insoluble matter, 15 ml of 42% borofluoric acid was added. A precipitate, which had crystallized out, was collected by filtration and then dried, thereby obtaining 2.4 g of tetrazonium difluoroborate (yield: 74%).

Dissolved next in 200 ml of N,N-dimethylformamide were 2.0 g of the above-obtained tetrazonium difluoroborate and 1.7 g of 2-hydroxy-3-naphthoic anilide, followed by a dropwise addition of a solution of 1.5 g of sodium acetate and 30 ml of water at 0°–5° C. over 30 minutes. After stirring the reaction mixture for 2 hours at the same temperature, the temperature of the reaction mixture was allowed to rise to room temperature and the reaction mixture was stirred overnight. Crystals which had been collected by filtration were repeatedly subjected to dispersion four time into 200 ml portions of N,N-dimethylformamide and 5 times into 200 ml portions of water. The crystals were then dried to obtain 2.6 g of the disazo compound of the above Compound No. 1 (yield: 75.8%). The thus-obtained powder had a bluish black color and did not melt up to 300° C. It was confirmed to be the intended product from its elemental analysis data and infrared absorption spectrum (measured by the KBr method).

Elemental analysis:

|  | C | H | N |
| --- | --- | --- | --- |
| Found (%) | 77.25 | 4.34 | 10.01 |
| Calculated (%) | 77.38 | 4.40 | 10.03 |

IR absorption spectrum: Absorption based on $>C=O$: 1660 cm$^{-1}$

The IR absorption spectrum (measured by the KBr method) is shown in FIG. 1.

PREPARATION EXAMPLES 2–8

Various bisazo compounds shown in Table 3 were synthesized in the same manner as in Preparation Example 1 except that the compounds corresponding to disazo compounds shown in Table 3 were used as coupler compounds in lieu of 2-hydroxy-3-naphthoic anilide.

PREPARATION EXAMPLE 9

The bisazo dyestuff of the above Compound No. 47 was synthesized in the same manner as in Preparation Example 1 except that a diamine compound represented by the following structural formula:

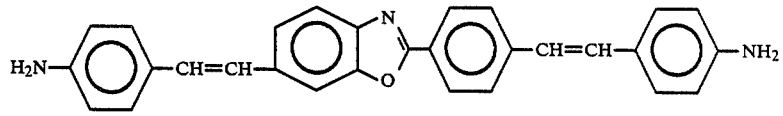

PREPARATION EXAMPLES 10–15

Various disazo compounds shown in Table 3 were synthesized in the same manner as in Preparation Example 9 except that the compounds corresponding to disazo compounds shown in Table 3 were used as coupler compounds in lieu of 2-hydroxy-3-naphthoic anilide.

Elemental analysis data, infrared absorption spectra (the KBr method, $\nu_{C=O}$) and melting points of the bisazo compounds obtained in Preparation Examples 2–15 respectively are given in Table 3.

TABLE 3

| Preparation Example | Bisazo dyestuff No. | Elemental analysis data | | | IR absorption spectrum | Melting point (°C.) |
| --- | --- | --- | --- | --- | --- | --- |
|  |  |  | Calculated (%) | Found (%) |  |  |
| 2 | 3 | C | 77.83 | 77.80 | 1670 | >300 |
|  |  | H | 4.94 | 4.90 |  |  |
|  |  | N | 9.49 | 9.51 |  |  |
| 3 | 12 | C | 70.85 | 70.85 | 1675 | >300 |

TABLE 3-continued

| Preparation Example | Bisazo dye-stuff No. | Elemental analysis data | | | IR absorption spectrum | Melting point (°C.) |
|---|---|---|---|---|---|---|
| | | | Calculated (%) | Found (%) | | |
| | | H | 3.84 | 3.78 | | |
| | | N | 11.81 | 11.80 | | |
| 4 | 23 | C | 76.05 | 76.08 | 1660 | >300 |
| | | H | 4.36 | 4.32 | | |
| | | N | 10.37 | 10.29 | | |
| 5 | 24 | C | 73.53 | 73.38 | 1670 | >300 |
| | | H | 3.84 | 3.78 | | |
| | | N | 10.29 | 10.14 | | |
| | | Cl | 5.80 | 5.86 | | |
| 6 | 32 | C | 76.27 | 76.52 | 1660 | >300 |
| | | H | 4.59 | 4.61 | | |
| | | N | 10.14 | 10.04 | | |
| 7 | 36 | C | 77.01 | 76.82 | 1675 | >300 |
| | | H | 3.98 | 3.90 | | |
| | | N | 12.51 | 12.50 | | |
| 8 | 45 | C | 76.25 | 76.03 | 1700 | >300 |
| | | H | 3.62 | 3.59 | | |
| | | N | 12.32 | 12.30 | | |
| 9 | 47 | C | 77.38 | 77.50 | 1660 | >300 |
| | | H | 4.40 | 4.45 | | |
| | | N | 10.03 | 10.10 | | |
| 10 | 49 | C | 77.83 | 77.75 | 1670 | >300 |
| | | H | 4.94 | 4.92 | | |
| | | N | 9.49 | 9.40 | | |
| 11 | 53 | C | 70.85 | 70.92 | 1675 | >300 |
| | | H | 3.84 | 3.82 | | |
| | | N | 11.81 | 11.53 | | |
| 12 | 55 | C | 75.49 | 75.21 | 1670 | >300 |
| | | H | 4.79 | 4.71 | | |
| | | N | 9.20 | 9.08 | | |
| 13 | 69 | C | 79.75 | 79.92 | 1675 | >300 |
| | | H | 4.40 | 4.25 | | |
| | | N | 1.12 | 1.08 | | |
| 14 | 78 | C | 74.01 | 73.83 | 1653 | >300 |
| | | H | 4.75 | 4.62 | 1692 | |
| | | N | 9.91 | 9.75 | | |
| 15 | 83 | C | 76.25 | 75.94 | 1700 | >300 |
| | | H | 3.62 | 3.38 | | |
| | | N | 12.32 | 12.21 | | |

EXAMPLE 1

In a ball mill, 0.5 part of a polyester resin (trade name: "Adhesive 49000", product of E. I. du Pont de Nemours & Co., Inc.), 0.5 part of Bisazo Compound No. 1 and 50 parts of tetrahydrofuran were ground and mixed. An aluminum plate was coated with the thus-obtained dispersion by a wire bar, followed by drying at 80° C. for 20 minutes to form a charge-generating layer of about 1 μm thick. Coated over the charge-generating layer by means of a wire bar was a solution of 1 part of 9-ethylcarbazole-3-aldehyde-1-methyl-1-phenylhydrazone and 1 part of a polyester resin (trade name: "Vyron 200", product of Toyobo Co., Ltd.) in 10 parts of chloroform. The thus-coated solution was dried at 80° C. for 30 minutes to form a charge-transporting layer of about 18 μm thick, thereby fabricating the laminated photoreceptor shown in FIG. 3.

Using a testing apparatus for electrostatic copying paper ("Model EPA-8100", trade name; manufactured by Kawaguchi Denki Seisakusho, Co. Ltd.), the photoreceptor was charged by a corona discharge at an impression voltage of −6 KV. The surface potential $V_0$ at that time was measured. The receptor was left over for 2 seconds in a dark place and the surface potential $V_2$ at that time was also measured. Under conditions such that the surface illuminance of the photoreceptor reached 5 lux, the photoreceptor was exposed to light from a halogen lamp (color temperature: 2856° K.) and the exposure time required to reduce the surface potential $V_2$ to one half was measured. A half-value exposure $E_{\frac{1}{2}}$(lux·sec) was then calculated. In addition, the surface potential $V_R$ after exposure to light for 10 seconds, i.e., the residual potential was also measured.

EXAMPLES 2–9

Photoreceptors were separately fabricated in the same manner as in Example 1 except that Bisazo Compound Nos. 3, 12, 32, 36, 45, 47, 49 and 69 were respectively used in place of Bisazo Compound No. 1, followed by measurement of their $E_{\frac{1}{2}}$ values. Results are shown in Table 4.

TABLE 4

| Example | Disazo compound | $V_0$ (V) | $V_2$ (V) | $V_R$ (V) | $E_{\frac{1}{2}}$ (lux.sec) |
|---|---|---|---|---|---|
| 1 | 1 | −940 | −918 | −1 | 2.8 |
| 2 | 3 | −991 | −978 | −2 | 1.5 |
| 3 | 12 | −853 | −831 | −1 | 1.8 |
| 4 | 32 | −1013 | −984 | 0 | 0.9 |
| 5 | 36 | −790 | −770 | −3 | 2.0 |
| 6 | 45 | −924 | −901 | −2 | 2.5 |
| 7 | 47 | −897 | −878 | −1 | 2.4 |
| 8 | 49 | −912 | −893 | 0 | 1.1 |
| 9 | 69 | −618 | −597 | −3 | 2.9 |

EXAMPLES 10–18

Photoreceptors were separately fabricated in the same manner as in Example 1 except that 1-phenyl-3-(4-diethylaminostyryl)-5-(4-diethylaminophenyl)pyrazoline was employed as a charge-transporting material in lieu of 9-ethylcarbazole-3-aldehyde-1-methyl-1-phenylhydrazone and bisazo compounds shown in Table 5 were used as charge-generating materials respectively, followed by measurement of their $E_{\frac{1}{2}}$ values. Results are shown in Table 5.

TABLE 5

| Example | Bisazo compound | $V_0$ (V) | $V_2$ (V) | $V_R$ (V) | $E_{\frac{1}{2}}$ (lux·sec) |
|---|---|---|---|---|---|
| 10 | 3 | −788 | −771 | −1 | 1.8 |
| 11 | 23 | −952 | −940 | 0 | 1.0 |
| 12 | 24 | −815 | −790 | −1 | 1.9 |
| 13 | 45 | −832 | −817 | −3 | 2.0 |
| 14 | 47 | −971 | −959 | −1 | 1.9 |
| 15 | 53 | −763 | −751 | −1 | 1.6 |
| 16 | 55 | −938 | −923 | 0 | 1.2 |
| 17 | 78 | −851 | −832 | −2 | 1.7 |
| 18 | 83 | −927 | −906 | −1 | 1.8 |

EXAMPLES 19–25

Photoreceptors were separately fabricated in the same manner as in Example 1 except that 2,5-bis(4-diethylaminophenyl)-1,3,4-oxadiazole was employed as a charge-transporting material in lieu of 9-ethyl-carbazole-3-aldehyde-1-methyl-1-phenylhydrazine and disazo compounds shown in Table 6 were used as charge-generating materials respectively, followed by measurement of their $E_{\frac{1}{2}}$ values. Results are shown in Table 6.

TABLE 6

| Example | Bisazo compound | $V_0$ (V) | $V_2$ (V) | $V_R$ (V) | $E_{\frac{1}{2}}$ (lux·sec) |
|---|---|---|---|---|---|
| 19 | 1 | −944 | −928 | −1 | 3.0 |
| 20 | 23 | −911 | −892 | −3 | 1.5 |
| 21 | 24 | −672 | −660 | −1 | 2.0 |
| 22 | 32 | −826 | −812 | −1 | 1.2 |
| 23 | 47 | −904 | −889 | −1 | 2.5 |
| 24 | 49 | −783 | −770 | 0 | 1.0 |
| 25 | 55 | −947 | −926 | −2 | 1.5 |

COMPARATIVE EXAMPLE 1

A photoreceptor was fabricated in the same manner as in Example 1 except that a bisazo compound of the following structural formula:

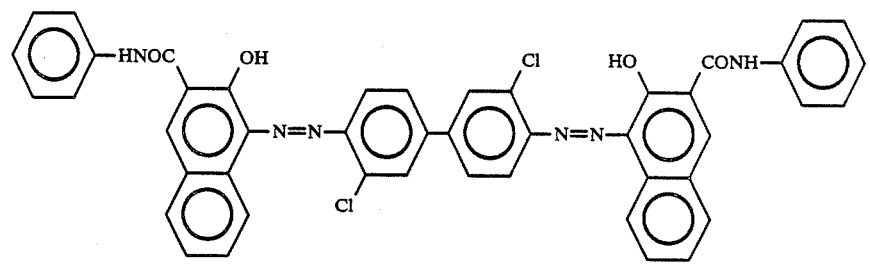

which is disclosed in Japanese Patent Publication No. 42380/1980, was used as a charge-generating material. $E_{\frac{1}{2}}$ was 12.0 (lux·sec).

COMPARATIVE EXAMPLE 2

A photoreceptor was fabricated in the same manner as in Example 1 except that a bisazo compound of the following structural formula:

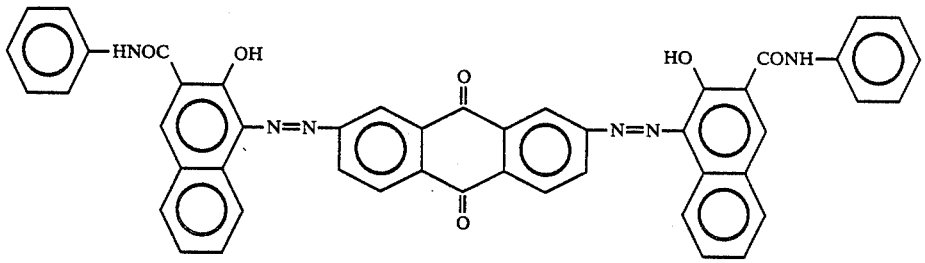

which is disclosed in Japanese Patent Laid-Open No. 202451/1983, was used as a charge-generating material. $E_{\frac{1}{2}}$ was 11.4 (lux·sec).

EXAMPLE 26

Separately using the photoreceptors fabricated in Examples 1, 8 and 11 respectively, an electrification-exposure operation was repeated 1,000 times to obtain values shown in Table 7.

TABLE 7

| Photoreceptor | # of repetition | $V_0$ (V) | $V_2$ (V) | $V_R$ (V) | $E_{\frac{1}{2}}$ (lux·sec) |
|---|---|---|---|---|---|
| Example 1 | 1 | −940 | −918 | −1 | 2.8 |
|  | 1000 | −935 | −908 | −2 | 2.9 |
| Example 8 | 1 | −912 | −893 | 0 | 1.1 |
|  | 1000 | −920 | −904 | −1 | 1.1 |
| Example 11 | 1 | −952 | −940 | 0 | 1.0 |
|  | 1000 | −948 | −932 | 0 | 1.0 |

As has been described above, the electrophotographic photoreceptor making use of the a bisazo compound of this invention has high sensitivity and shows stable performance even when used repeatedly. Accordingly, the electrophotographic photoreceptors of this invention have excellent durability.

The electrophotographic photoreceptor of this invention can therefore be used widely not only in electrophotographic copying machines but also in various printers and electrophotographic plate-making systems both of which utilize the principle of electrophotographic copying.

I claim:

1. In an electrophotographic photoreceptor including an electrically-conductive base and a photosensitive layer provided on the base, the improvement wherein the photosensitive layer contains at least one bisazo compound represented by the following general formula (I):

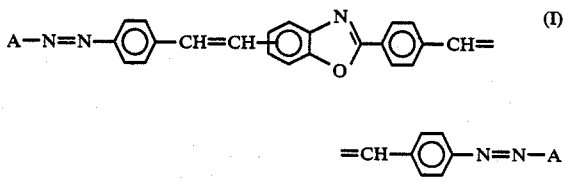

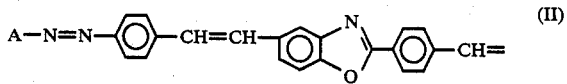

wherein A means a coupler residuum.

2. The electrophotographic photoreceptor as claimed in claim 1, wherein the bisazo compound is represented by the following general formula (II):

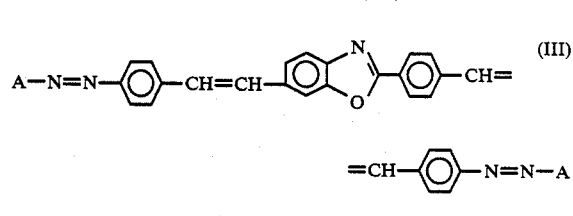

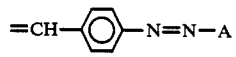

wherein A means a coupler residuum.

3. The electrophotographic photoreceptor as claimed in claim 1, wherein the bisazo compound is represented by the following general formula (III):

(III)

A—N=N—◯—CH=CH—◯—CH=

=CH—◯—N=N—A wherein A means a coupler residuum.

4. The electrophotographic photoreceptor as claimed in claim 1, wherein the photosensitive layer contains at least a charge-transporting material and a binder in addition to the bisazo compound.

5. The electrophotographic photoreceptor as claimed in claim 4, wherein the content of the bisazo compound in the photosensitive layer is at most 50 wt.%.

6. The electrophotographic photoreceptor as claimed in claim 4, wherein the content of the charge-transporting material in the photosensitive layer is 10-95 wt.%.

7. The electrophotographic photoreceptor as claimed in claim 1, wherein the photosensitive layer is a laminate of a charge producing layer, which contains the bisazo compound, and a charge transfer layer which contains a charge-transporting material.

8. The electrophotographic photoreceptor as claimed in claim 7, wherein the content of the disazo compound is at least 30 wt.%.

9. The electrophotographic photoreceptor as claimed in claim 7, wherein the content of the charge-transporting material is 10-95 wt.%.